(12) United States Patent
Matsumoto et al.

(10) Patent No.: US 7,295,887 B2
(45) Date of Patent: Nov. 13, 2007

(54) MACHINE MANAGEMENT SYSTEM AND MESSAGE SERVER USED FOR MACHINE MANAGEMENT

(75) Inventors: Kohei Matsumoto, Tokyo (JP); Hideki Ozawa, Tokyo (JP); Mikako Yoda, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 253 days.

(21) Appl. No.: 11/061,170

(22) Filed: Feb. 17, 2005

(65) Prior Publication Data

US 2005/0188376 A1 Aug. 25, 2005

(30) Foreign Application Priority Data

Feb. 20, 2004 (JP) .............................. 2004-043902
Jun. 3, 2004 (JP) .............................. 2004-165827
Jun. 11, 2004 (JP) .............................. 2004-173297

(51) Int. Cl.
*G06F 19/00* (2006.01)
(52) U.S. Cl. .................................................... 700/174
(58) Field of Classification Search ................ 700/174, 700/175, 177
See application file for complete search history.

(56) References Cited

U.S. PATENT DOCUMENTS

| 5,420,977 A | * | 5/1995 | Sztipanovits et al. ....... 715/853 |
| 5,557,549 A | | 9/1996 | Chang |
| 5,657,460 A | | 8/1997 | Egan et al. |
| 2003/0005486 A1 | * | 1/2003 | Ridolfo et al. ............. 800/288 |

FOREIGN PATENT DOCUMENTS

| CN | 1086028 | 4/1994 |
| CN | 2429385 | 5/2001 |
| EP | 0 905 634 A2 | 3/1999 |
| JP | 10-161733 | 6/1998 |
| JP | 10-320031 | 12/1998 |
| JP | 11-149312 | 6/1999 |
| JP | 2001-134314 | 5/2001 |
| JP | 2002-010302 | 1/2002 |
| JP | 2004-29897 | 1/2004 |
| JP | 2004029897 | 1/2004 |

OTHER PUBLICATIONS

Hills et al., Man Machine Interface and its Implementaion{at Sizewell B}, IEEE Sep. 14, 1992, pp. 103-108.*
European Search Report dated Jun. 29, 2005.
Chinese Office Action dated Dec. 29, 2006 (10 pages) with partial English translation (1 page).

* cited by examiner

*Primary Examiner*—Leo Picard
*Assistant Examiner*—Chad Rapp
(74) *Attorney, Agent, or Firm*—John J. Penny, Jr.; Steven M. Cohen; Edwards Angell Palmer & Dodge LLP

(57) ABSTRACT

Machines existing in a plant are classified under a multilevel hierarchy and are displayed on a screen. A summary of a diagnosis result of one or more nondisplayed machines which is not displayed on the screen and is classified to a level lower than that of the machines displayed on the screen. Therefore, the diagnosis result of the nondisplayed machines can also be seen on the screen and oversights of machine management can be prevented.

25 Claims, 14 Drawing Sheets

MACHINE MANAGEMENT SYSTEM AND MESSAGE SERVER USED FOR MACHINE MANAGEMENT

BACKGROUND OF THE INVENTION

1. Field of the Invention

This invention relates to a machine management system for managing machines existing in a plant and a message server used for the machine management.

2. Description of the Related Art

A machine management system, can manage machines systematically according to a tree structure called a plant hierarchy. It also has a function of displaying the diagnosis result of each machine.

FIG. 1 is a drawing to show a display screen example of a machine management system in a related art.

As shown in FIG. 1, the machines existing in a plant are classified under a multilevel hierarchy and are displayed on a screen as a tree structure. In the figure, an icon "☐" represents a plant hierarchy level and an icon "O" represents a machine.

An icon representing the diagnosis result is displayed for each machine on the tree. In the figure, the diagnosis result is displayed as an icon for machines A to H. If the diagnosis result is normal, the icon "O" is displayed; if the diagnosis result is abnormal, a mark "!" is displayed in the icon "O".

The letter in the icon "☐" represents the type of plant hierarchy level. The correspondence between the letters and the plant hierarchy levels is as follows:

S: Site, A: Area, C: Process Cell, U: Unit, E:

Equipment Module

Each machine is assigned to the hierarchy level of Equipment Module on the tree structure of the plant hierarchy. The user can switch between display and non-display modes of subordinate hierarchy levels to each node as desired. The diagnosis result of each machine is displayed in the node of the machine on the tree.

JP-A-2004-29897 discloses a machine management system for managing machines existing in a plant.

However, in the display mode of the related art, the diagnosis result of one machine is displayed only in the node of the machine on the screen. Thus, the user cannot see on the screen that the diagnosis result of a machine at a lower level not displayed on the screen is abnormal.

SUMMARY OF THE INVENTION

The object of the invention is to provide a machine management system and a message server that can prevent oversights of machine management.

DETAILED DESCRIPTION OF THE PREFERRED EMBODIMENTS

Figure 1:
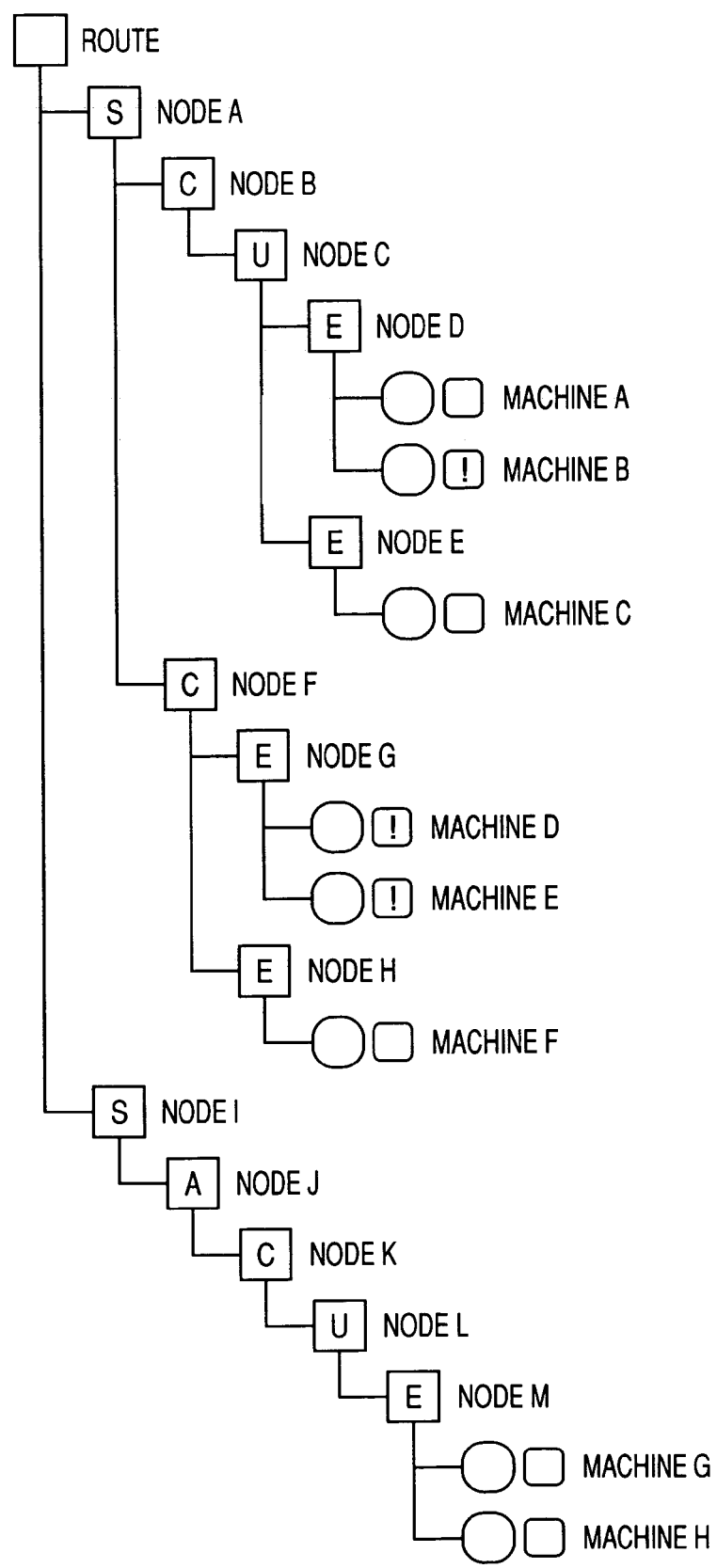
FIG. 1 is a drawing to show a display screen example of a machine management system in a related art.

Referring to the drawings, embodiments of the invention are explained below.

(A) First Embodiment

Figure 2:
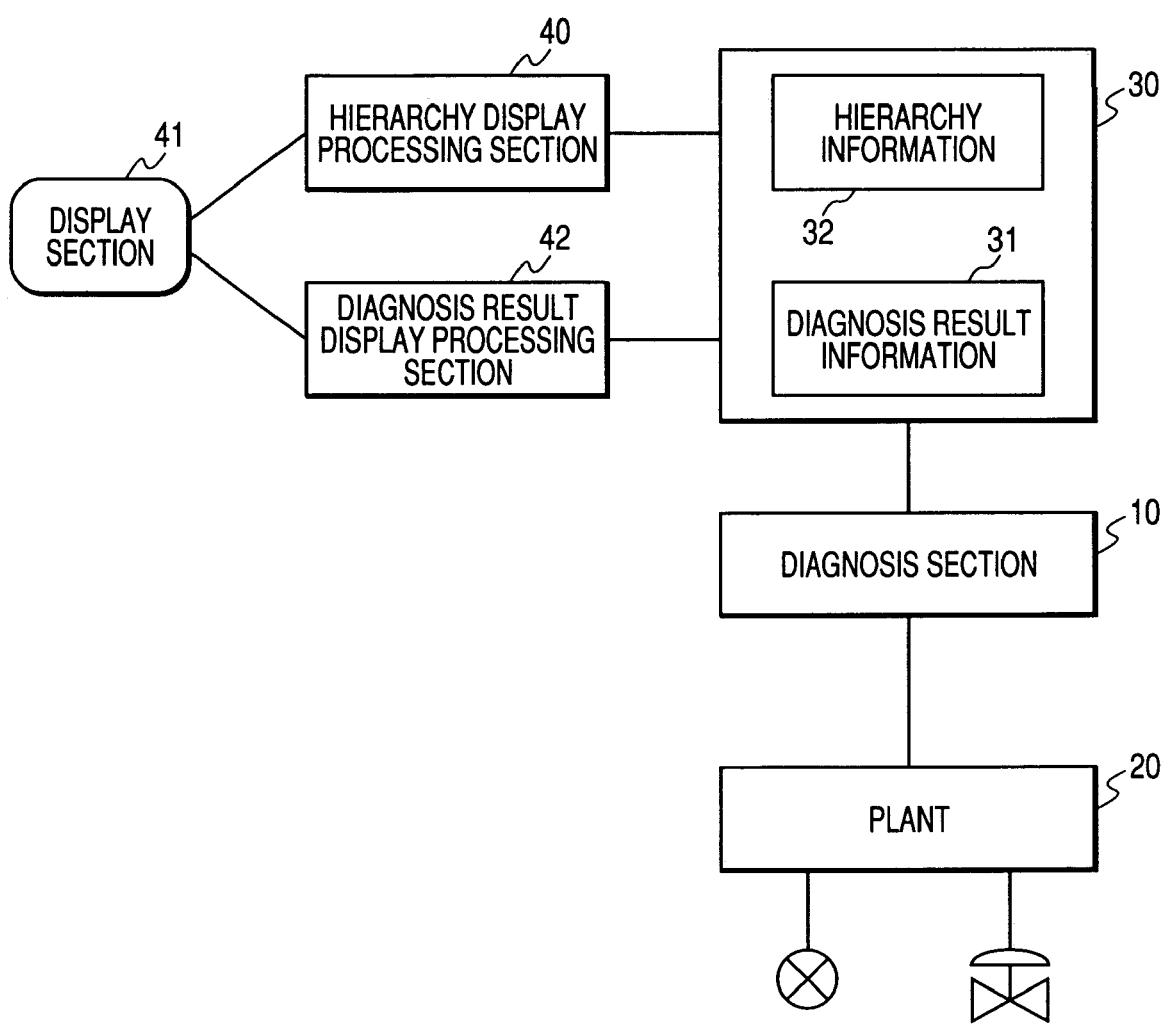
FIG. 2 is a block diagram to show a first embodiment of the invention.

FIG. 2 is a block diagram to show a first embodiment of the invention.

In FIG. 2, a diagnosis section 10 diagnoses each machine existing in a plant 20. The plant 20 is a plant of petrochemistry, steel, paper and pulp, foods, chemicals, electric power, etc., for example.

The machines existing in the plant 20 are sensor machines for detecting the process values of temperature, pressure, liquid level, etc., valve positioners for controlling valves, and the like.

A storage section 30 stores diagnosis result information 31 of the diagnosis section 10, hierarchy information 32 systematically indicating a plant hierarchy as a tree structure, and the like.

A hierarchy display processing section 40 classifies the machines existing in the plant 20 under a multilevel hierarchy and processes to display them on a screen of a display section 41 as a tree structure.

A diagnosis result display processing section 42 processes to display the diagnosis result of each machine displayed on the screen of the display section 41 and also processes to display a summary of the diagnosis results of one or more nondisplayed machines which is not displayed on the screen of the display section 41 and is classified to a level lower than that of the machines displayed on the screen of the display section 41.

Figure 3:
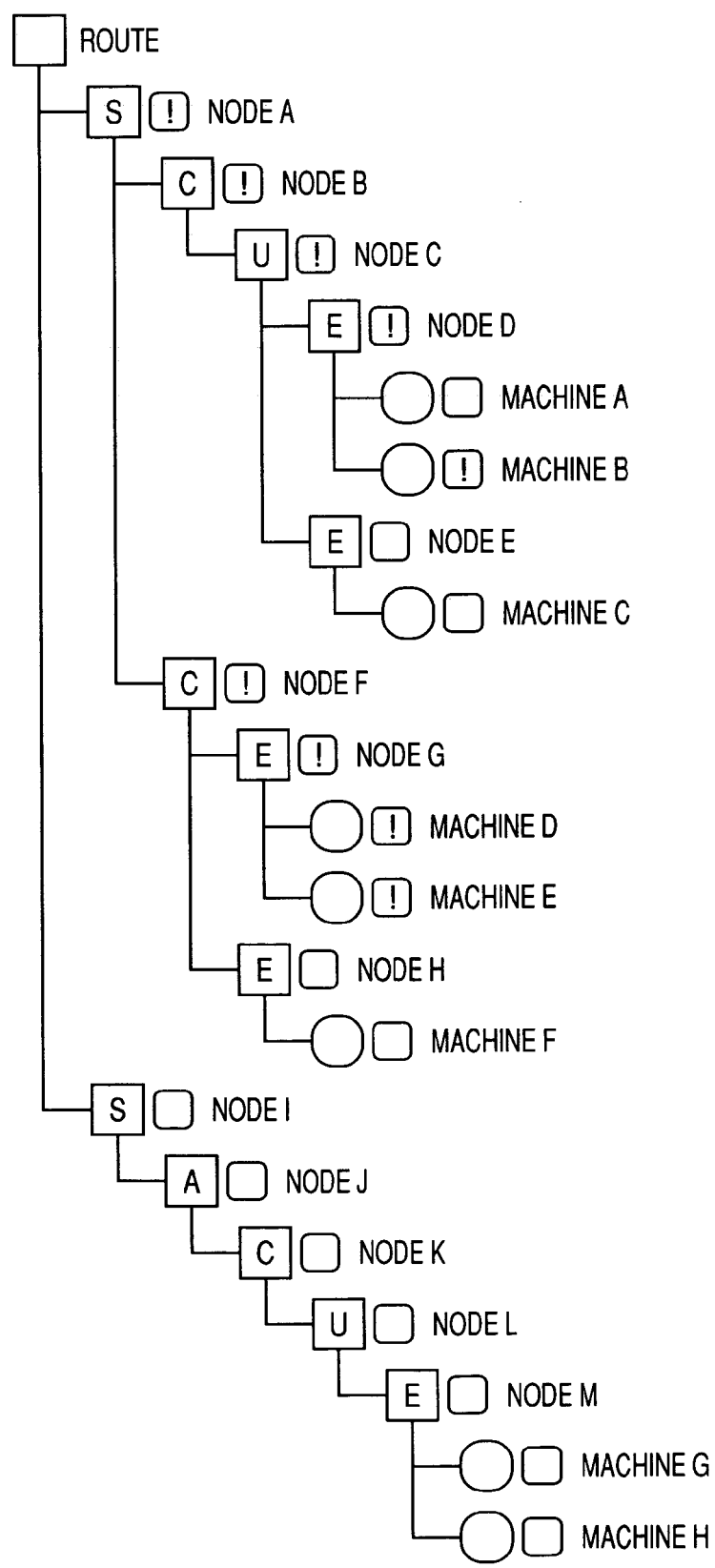
FIG. 3 is a drawing to show a display screen example of a machine management system in FIG. 2.

FIG. 3 is a drawing to show a display screen example of the machine management system in FIG. 2.

In FIG. 3, the tree structure is displayed in a similar manner to that in FIG. 1.

In FIG. 3, an icon representing the diagnosis result is displayed in each node of the tree. In the node of each machine, the diagnosis result of the machine is displayed.

In the plant hierarchy nodes, a summary of the diagnosis results of the machines existing at the lower levels is displayed. If the diagnosis results of all machines belonging to the lower levels of the plant hierarchy are normal, a normal icon is displayed. If the diagnosis result of one of the machines belonging to the lower levels of the plant hierarchy is abnormal, an abnormal icon is displayed. Even if all displayed machines are normal, if a machine not displayed at the lower level is abnormal, an abnormal icon is displayed in the plant hierarchy. Such icon display is produced by the diagnosis result display processing section 42.

In the example in the figure, the icons are displayed as follows:

In the icon displayed in the machine node, if the diagnosis result is normal, an icon "O" is displayed; if the diagnosis is abnormal, a mark "!" is displayed in the icon "O".

In the icon displayed in the plant hierarchy node, if the diagnosis results of all machines belonging to the lower levels of the plant hierarchy are normal, an icon "O" is displayed. If the diagnosis result of one of the machines belonging to the lower levels of the plant hierarchy is abnormal, a mark "!" is displayed in the icon "O". Even if all displayed machines are normal, if a machine not displayed at the lower level is abnormal, the mark "!" is displayed in the icon "O".

In the example in FIG. 3, the icons are displayed as follows:

In node A, the diagnosis results of machines B, D, and E are abnormal and therefore an abnormal icon is displayed.

In node B, the diagnosis result of machine B is abnormal and therefore an abnormal icon is displayed.

In node C, the diagnosis result of machine B is abnormal and therefore an abnormal icon is displayed.

In node D, the diagnosis result of machine B is abnormal and therefore an abnormal icon is displayed.

In node E, an abnormal icon of the diagnosis result does not exist and therefore a normal icon is displayed.

In node F, the diagnosis results of machines D and E are abnormal and therefore an abnormal icon is displayed.

In node G, the diagnosis results of machines D and E are abnormal and therefore an abnormal icon is displayed.

In node H, an abnormal icon of the diagnosis result does not exist and therefore a normal icon is displayed.

In node I, an abnormal icon of the diagnosis result does not exist and therefore a normal icon is displayed.

In node J, an abnormal icon of the diagnosis result does not exist and therefore a normal icon is displayed.

In node K, an abnormal icon of the diagnosis result does not exist and therefore a normal icon is displayed.

In node L, an abnormal icon of the diagnosis result does not exist and therefore a normal icon is displayed.

In node M, an abnormal icon of the diagnosis result does not exist and therefore a normal icon is displayed.

In the embodiment in FIG. 2, at the higher plant hierarchy level, the user can see the fact that the diagnosis result of one machine at the lower level is abnormal. Accordingly, even when the machines are not displayed, the user can easily see the fact that the diagnosis result of one machine is abnormal. The user can easily trace the plant hierarchy with an abnormal icon in order to the lower levels, thereby reaching the machine whose diagnosis result is abnormal.

(B) Second Embodiment

Figure 4:
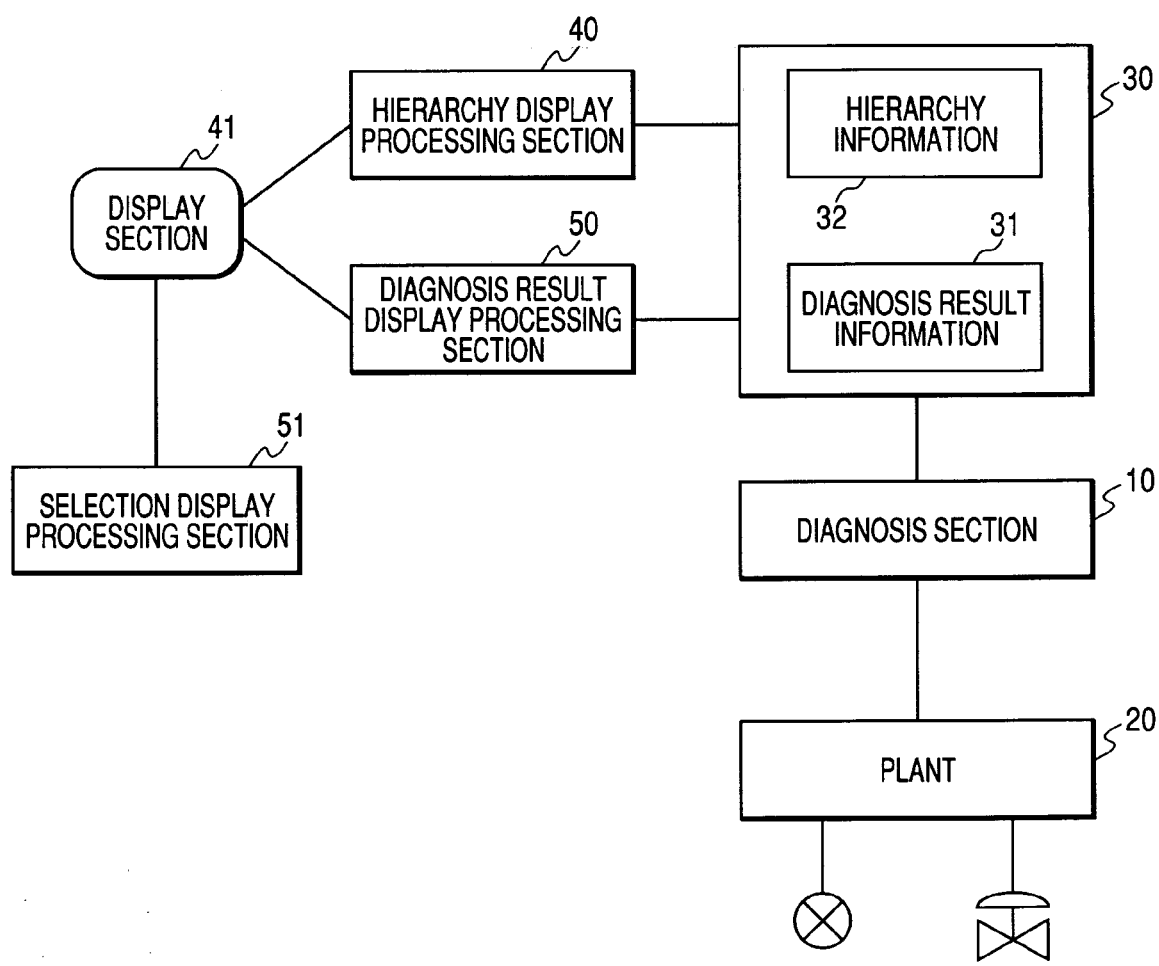
FIG. 4 is a block diagram to show a second embodiment of the invention.

FIG. 4 is a block diagram to show a second embodiment of the invention. Parts identical with those previously described with reference to FIG. 2 are denoted by the same reference numerals in FIG. 4.

In FIG. 4, a diagnosis result display processing section 50 processes to display the level of an alarm occurring in each machine displayed on a screen and also processes to display the alarm level at the higher level of the plant hierarchy to which the machines not displayed on the screen are connected.

The diagnosis result display processing section 50 processes to display the level of an alarm occurring in each machine displayed on a screen and also displays the highest level of the alarm levels of all machines containing the machines not displayed at the lower levels of the plant hierarchy displayed on the screen.

A selection display processing section 51 processes to selectively display the machines whose alarm level is equal to or greater than a predetermined level.

Figure 5A:
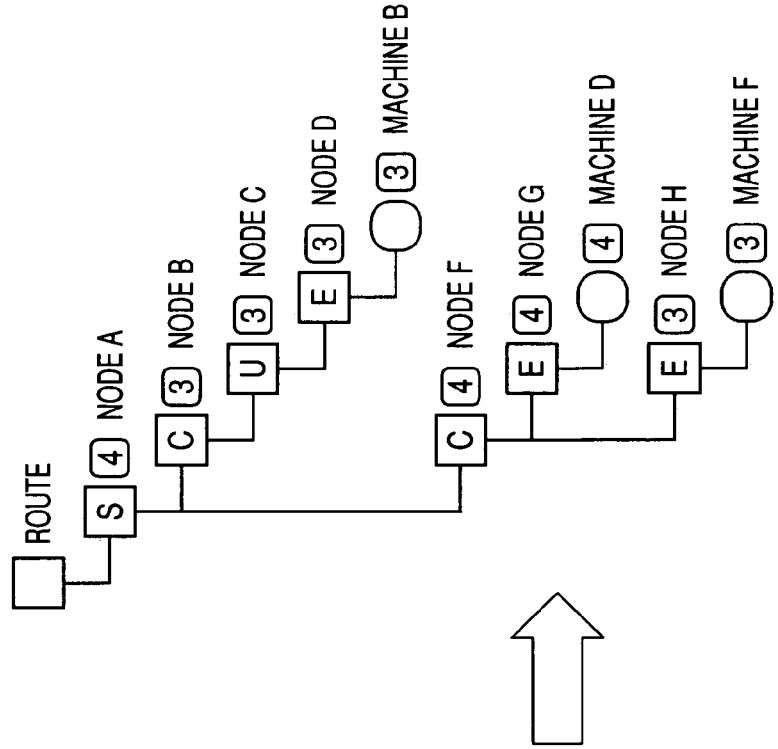
FIGS. 5A and 5B are drawings to show a display screen example of a machine management system in FIG. 4.
Figure 5B:
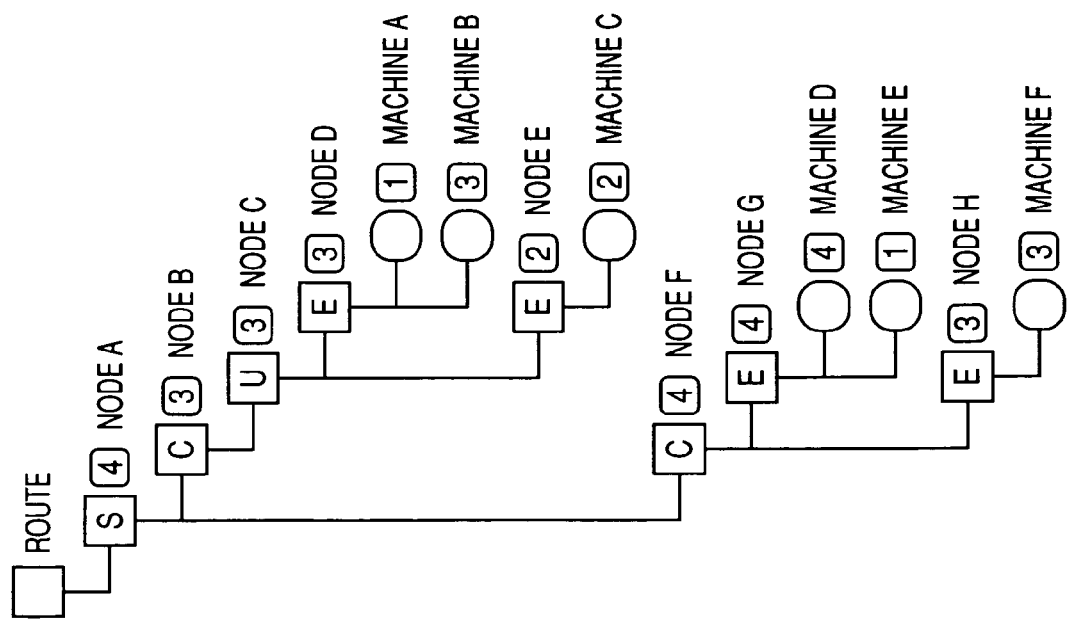

FIGS. 5A and 5B are drawings to show a display screen example of the machine management system in FIG. 4.

In the display example, the alarm level is displayed as an icon and the machines at the predetermined level or more are selectively displayed. FIG. 5A shows a display screen before selection and FIG. 5B shows a display screen after selection.

In FIGS. 5A, and 5B icon representing the alarm level is displayed in each node of the tree. In the node of each machine, the alarm level of the machine is displayed. In each plant hierarchy node, the highest level of the alarm levels occurring in the machines existing at the lower levels of the hierarchy is displayed. In the example, the numeric value indicated in the icon represents the alarm level. The larger the numeric value, the higher the alarm level.

In the embodiment, each machine is provided with the state of the alarm level. In each plant hierarchy node, the highest level of the alarm levels occurring in all machines belonging to the lower levels of the hierarchy is displayed. A-2

Further, the selection display processing section 51 processes to selectively display the alarm levels. In the example, FIG. 5A shows the whole tree structure and FIG. 5B shows a state in which only the nodes and machines whose alarm level is 3 or more are displayed.

In the example in FIG. 5B, in each plant hierarchy node, the alarm at the highest level of the alarm levels occurring in the machines belonging to the lower levels of the hierarchy is displayed, so that it is made possible for the user easily to visually check the plant hierarchy node and the machine where a highly important alarm occurs.

The selective display function of the tree based on the alarm level is provided, so that it is made possible for the user furthermore easily to visually check the plant hierarchy node and the machine where a highly important alarm occurs.

(C) Third Embodiment

Figure 6:
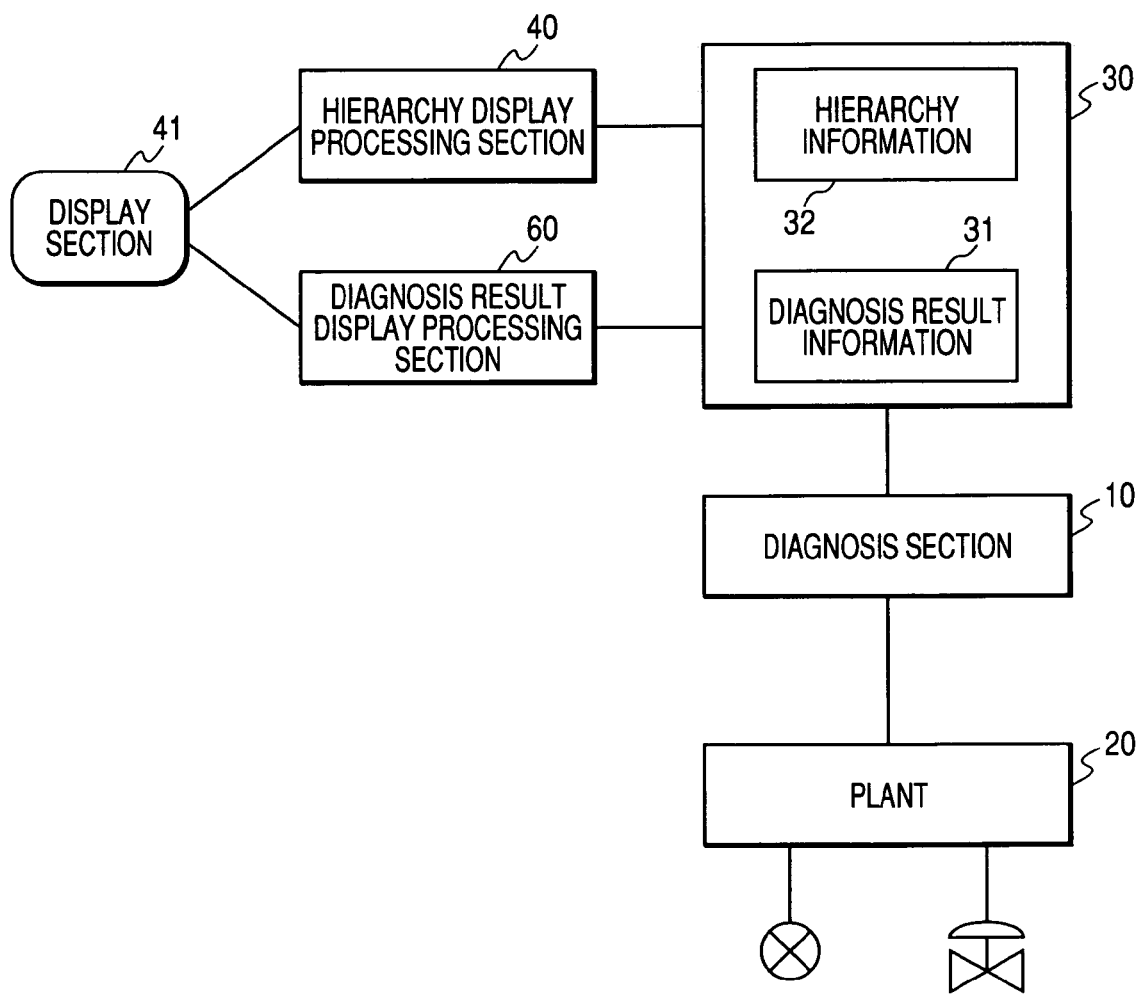
FIG. 6 is a block diagram to show a third embodiment of the invention.

FIG. 6 is a block diagram to show a third embodiment of the invention.

In FIG. 6, a diagnosis result display processing section 60 processes to display the state of each node displayed on a screen and also displays a summary of the states of all nodes containing the nodes not displayed at the lower levels than an intermediate hierarchy level.

In a manufacturing line, for example, "remaining amount of raw material" is linked with "state." In this case, "fact that remaining amount becomes small" or "fact that remaining amount has run out" can be represented as "state." "Fact that remaining amount becomes small" or "fact that remaining amount has run out" is set to "special state," whereby the remaining amount of the raw material in the manufacturing line can be represented as a tree structure.

In the above-described embodiment, the alarm state and the abnormal state are displayed in an easy-to-understand manner.

In contrast, the normal state can also be displayed in an easy-to-understand manner.

In the embodiment in FIG. 6, "usual state" is "not ready" and "special state" is "ready," whereby the whole ready situation can be represented as a tree structure.

Figure 7:
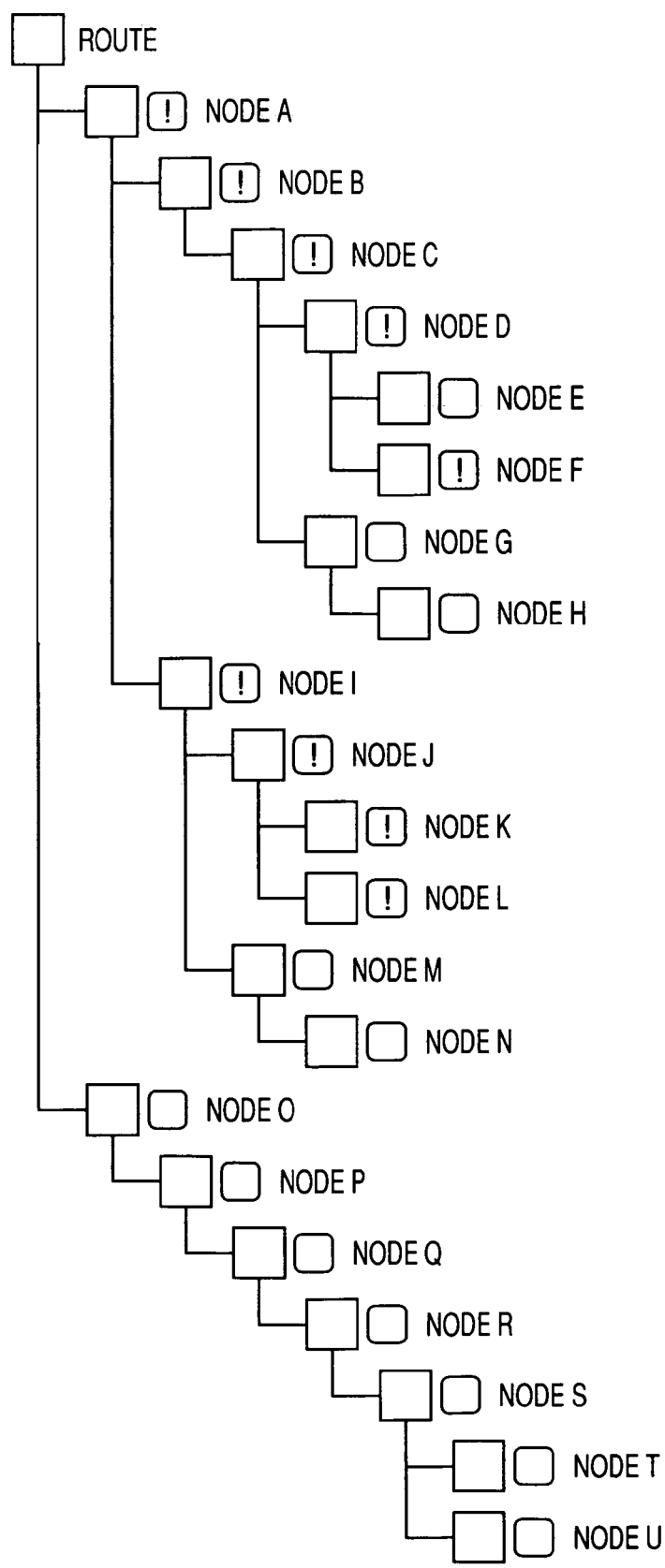
FIG. 7 is a drawing to show a display screen example of a machine management system in FIG. 6.

FIG. 7 is a drawing to show a display screen example of the machine management system in FIG. 6.

In FIG. 7, an icon representing the state is displayed in each node of the tree. In the end node, the state of the node is displayed. In a node at an intermediate hierarchy level, a summary of the states of the nodes positioned at the lower levels than the node is displayed.

In the icon displayed in the plant hierarchy node, if the states of all machines contained in the lower levels of the hierarchy are usual, an icon "O" is displayed. If the state of one of the machines contained in the lower levels of the hierarchy is special, a mark "!" is displayed in the icon "O". Even if all displayed nodes are usual state, if the state of a node not displayed at the lower level is special, the mark "!" is displayed in the icon "O".

In the example in the figure, the end node of the tree has one state. The node at an intermediate level of the hierarchy has the state provided by combining the states of the nodes at the lower levels than the node according to one condition.

In the embodiment in FIG. 6, a node at an intermediate level is provided with a summary of the nodes at the lower levels, so that it is made possible for the user to know the state of each node at the lower levels by seeing the node at the higher level. Accordingly, to search for a node in the special state at the lower levels, the user can trace the nodes placed in the special state in order to the lower levels, thereby easily reaching the node in the special state.

According to the first to third embodiments of the invention, the following advantages can be provided:

(1) The diagnosis result of a nondisplayed machine is displayed at the higher level of the hierarchy than the machine. Accordingly, even when the machines are not displayed, the user can easily see the fact that the diagnosis result of one machine is abnormal. The user can easily trace the plant hierarchy with an abnormal icon in order to the lower levels, thereby reaching the machine whose diagnosis result is abnormal.

(2) As the alarm levels of the machines are displayed, the plant hierarchy node and the machine where a highly important alarm occurs can be displayed in an easy-to-understand manner. The alarm levels of the nondisplayed machines can be recognized easily.

The selective display function of the tree based on the alarm level is provided, so that it is made possible for the user furthermore easily to visually check the plant hierarchy node and the machine where a highly important alarm occurs.

(3) A node at an intermediate level is provided with a summary of the nodes at the lower levels, so that it is made possible for the user to know the state of each node at the lower levels by seeing the node at the higher level. Accordingly, to search for a node in the special state at the lower levels, the user can trace the nodes placed in the special state in order to the lower levels, thereby easily reaching the node in the special state.

(4) The invention can be applied to general tree display. Accordingly, the operability of tree display can be enhanced.

(D) Fourth Embodiment

Figure 8:
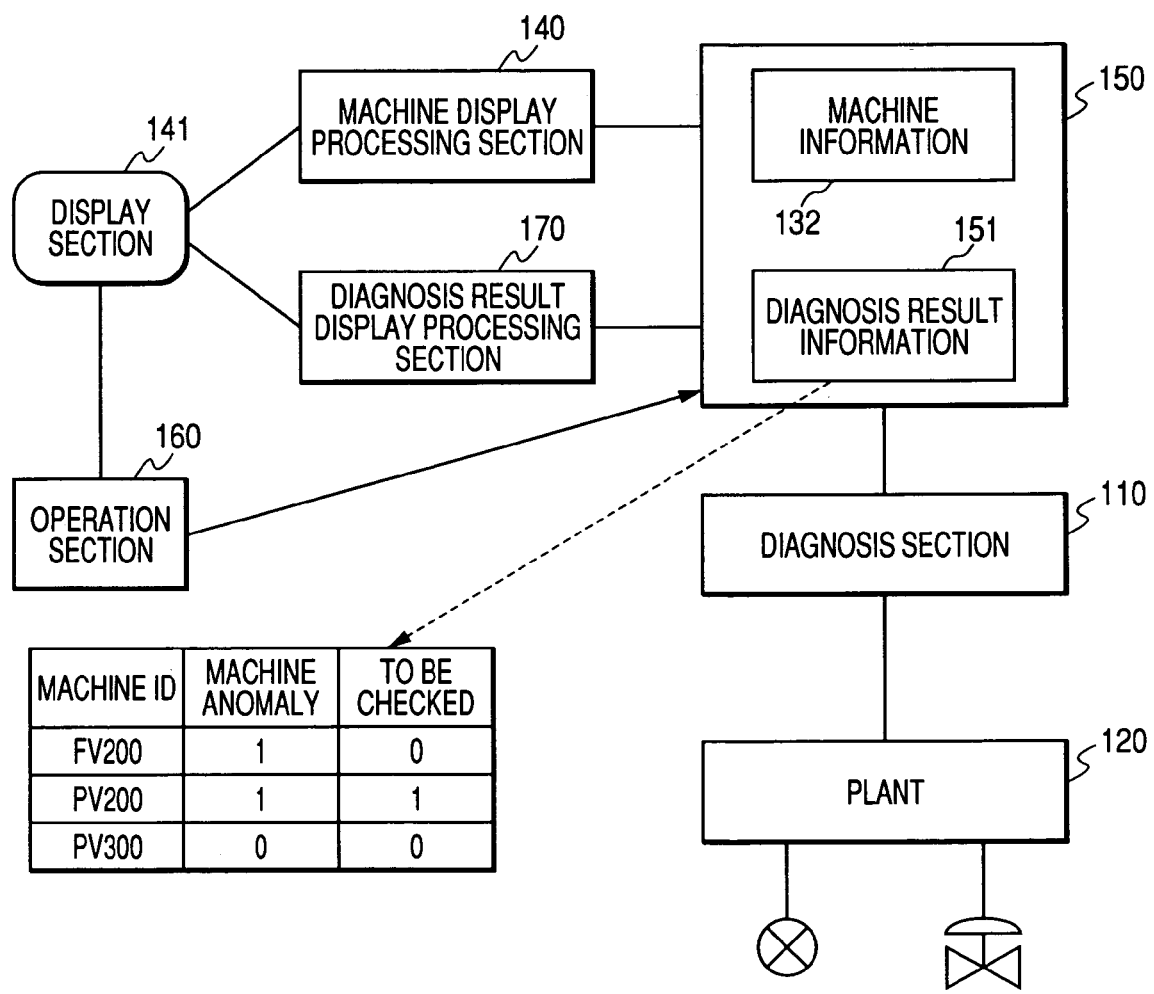
FIG. 8 is a block diagram to show a fourth embodiment of the invention.

FIG. 8 is a block diagram to show a fourth embodiment of the invention.

In FIG. 8, a diagnosis section 110 diagnoses each machine existing in a plant 120. The plant 120 is a plant of petrochemistry, steel, paper and pulp, foods, chemicals, electric power, etc., for example.

The machines existing in the plant 120 are sensor machines for detecting the process values of temperature, pressure, liquid level, etc., valve positioners for controlling valves, and the like.

A machine display processing section 140 classifies the machines existing in the plant 120 under a multilevel hierarchy and processes to display them on a screen of a display section 141 as a tree structure.

A storage section 150 stores diagnosis result information 151 of the diagnosis section 110, machine information 132 indicating the tag names, the machine IDs, the communication modes, etc., of the machines existing in the plant, hierarchy information systematically indicating a plant hierarchy as a tree structure, and the like.

An operation section 160 is a section for the user to perform anomaly check operation on a screen for the machine whose diagnosis result is abnormal. The operation section 160 is a mouse, a keyboard, etc., for example.

A diagnosis result display processing section 170 processes to display the diagnosis result of each machine on the screen of the display section 141. When the diagnosis result of a machine becomes abnormal, the diagnosis result display processing section 170 changes the anomaly display modes of the machine whose anomaly is not yet checked and the machine whose anomaly has been checked through the operation section 160. That is, when the diagnosis result of a machine becomes abnormal, the diagnosis result display processing section 170 processes to display the anomaly of the machine whose anomaly is not yet checked in a predetermined display mode and when the user performs anomaly check operation through the operation section 160 for the machine whose anomaly is not yet checked, the diagnosis result display processing section 170 changes the anomaly display mode.

The diagnosis result information 151 is information made up of entries of a machine ID, a flag indicating the presence or absence of machine anomaly, and a flag indicating "to be checked" for each machine as shown in FIG. 8. When the machine anomaly flag is "1," the machine is abnormal; when the machine anomaly flag is "0," the machine is normal. When the abnormal state occurring in the machine is not yet checked, the "to be checked" flag is set to "1," when the abnormal state has been checked, the "to be checked" flag is set to "0."

In the example in the figure, a machine anomaly occurred in machine FV200 and has been checked; a machine anomaly occurred in machine PV200 and is not yet checked; and PV300 is normal.

When the diagnosis result is normal, the diagnosis section 110 sets the machine anomaly flag to "0" and when abnormal, "1." When the user performs anomaly check operation through the operation section 160 for the machine displayed as abnormal, the "to be checked" flag is set to "0." When the user does not perform anomaly check operation, the "to be checked" flag is set to "1."

The diagnosis result display processing section 170 processes to display the machine diagnosis result on the display section 141 based on the machine anomaly flag and the "to be checked" flag.

Figure 9:
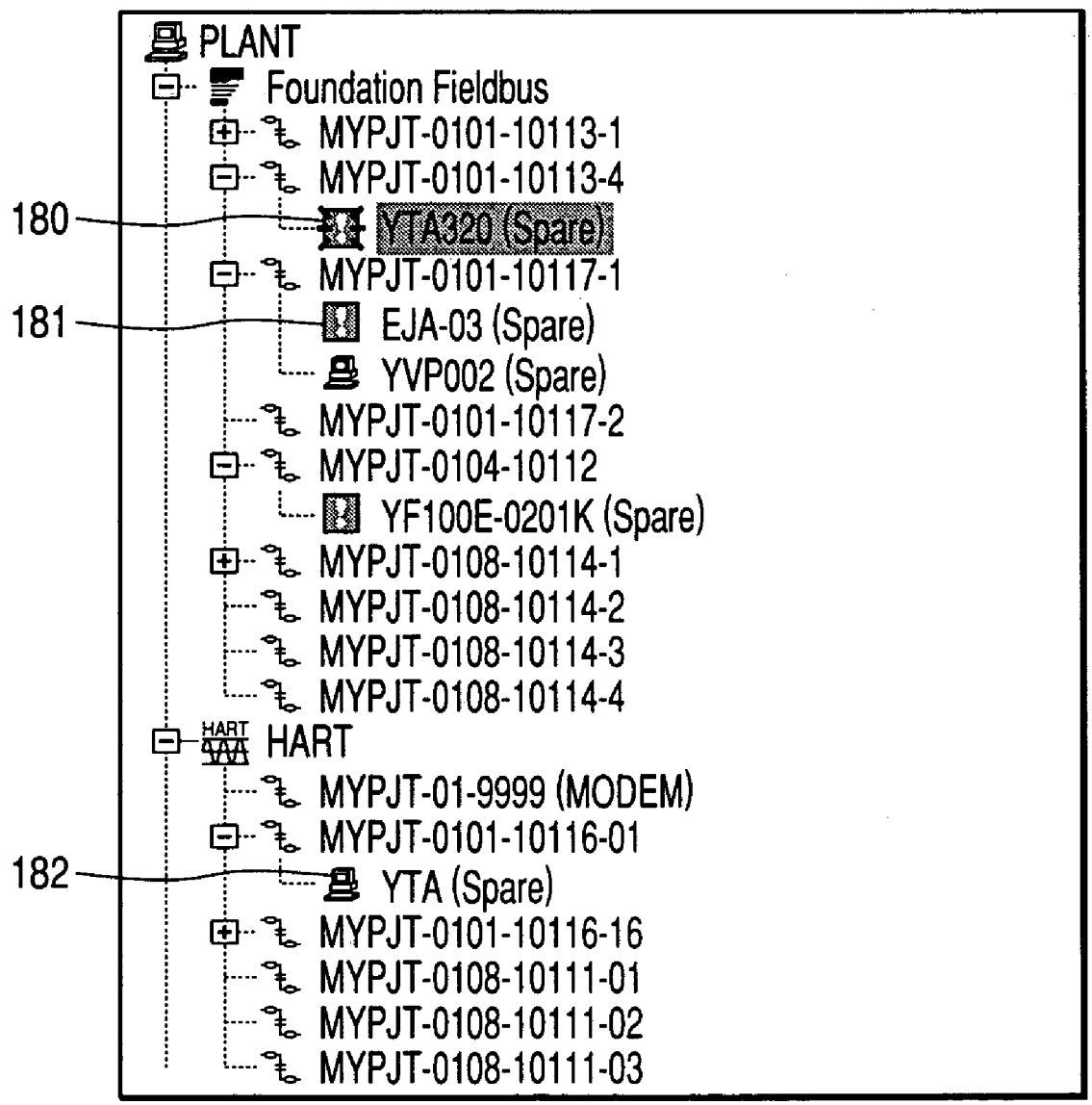
FIG. 9 is a drawing to show a display screen example of a machine management system in FIG. 8.

FIG. 9 is a drawing to show a display screen example of the machine management system in FIG. 8.

In FIG. 9, when a new diagnosis anomaly occurs, the user does not yet perform check operation and therefore an exclamation mark "!" added to the icon of the machine blinks as shown in anomaly display 180.

When the user performs check operation for the blinking mark "!," the blinking of the mark "!" stops as shown in anomaly display 181.

In the icon of a normal machine, the mark "!" is not displayed as shown in normal display 182.

Figure 10:
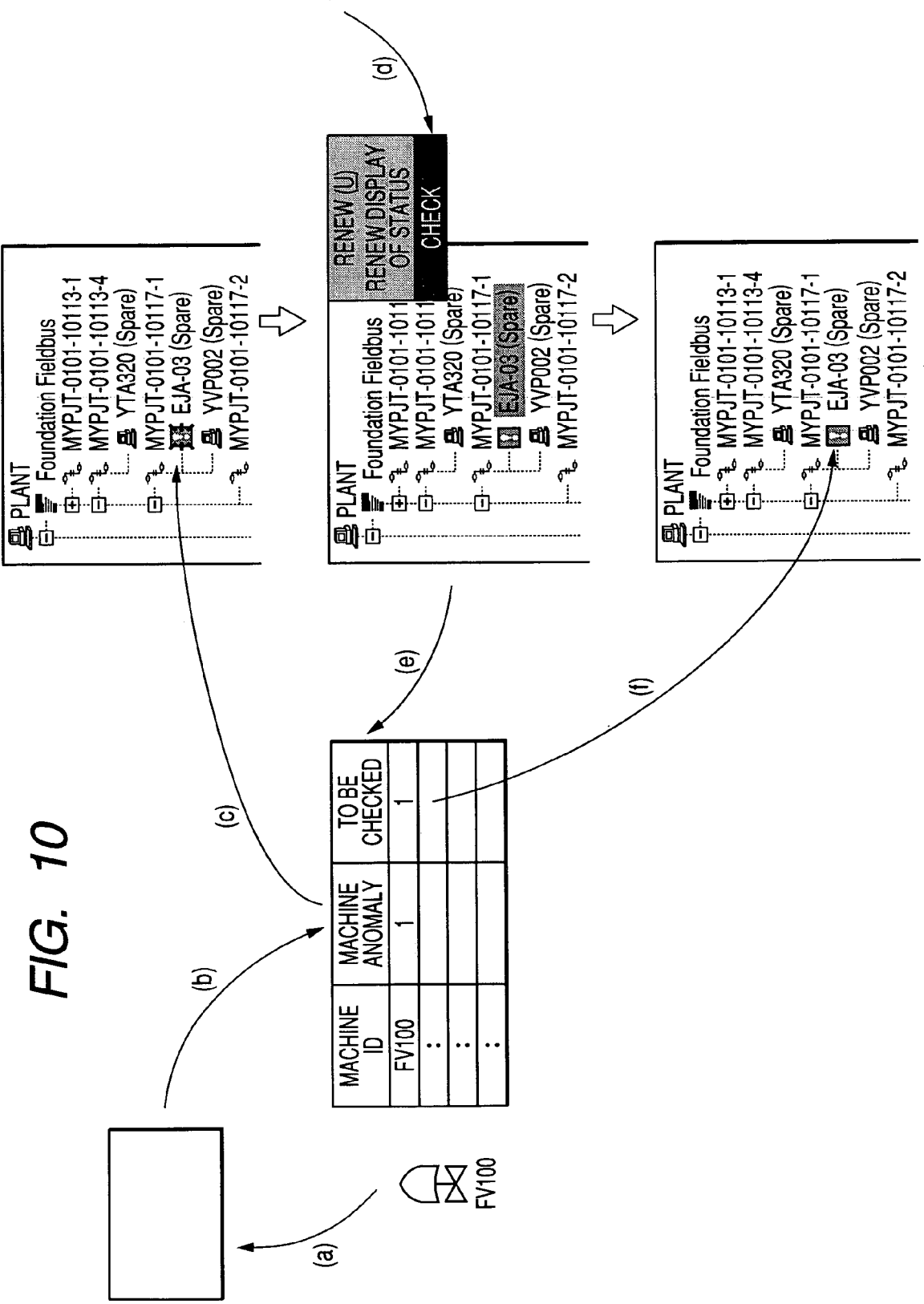
FIG. 10 is a schematic representation to show a display procedure of the machine management system in FIG. 8.

FIG. 10 is a schematic representation to show a display procedure of the machine management system in FIG. 8.

The display procedure will be discussed according to steps (a) to (f) in FIG. 10.

(a) The diagnosis section 110 collects data from the machines existing in the plant and diagnoses the machines based on the collected data.

(b) Upon detection of an anomaly in a machine, the diagnosis section 110 sets the "machine anomaly" and "to be checked" flags of the machine to ON (in the example in FIG. 10, "1").

(c) Since both the "machine anomaly" and "to be checked" flags are ON, the diagnosis result display processing section 170 processes to blink a mark "!" on the screen.

(d) The user clicks on "check" in a right menu through the operation section 160.

(e) As the user clicks on "check," the "to be checked" flag in the diagnosis result information 151 is set to OFF (in the example in FIG. 10, "0").

(f) Since the "to be checked" flag is OFF, the diagnosis result display processing section 170 processes to light the mark "!."

If a diagnosis anomaly again occurs in the machine whose anomaly has been checked for another reason, the diagnosis section 110 again sets the "to be checked" flag of the machine to ON. Thus, when the user again opens the screen, the mark "!" displayed in the icon part of the machine blinks, so that the user can find the new machine anomaly.

The machine state is thus managed in three categories of "normal," "anomaly (not yet checked)," and "anomaly (checked)."

The machine state may be displayed in any other display mode.

Figure 11:
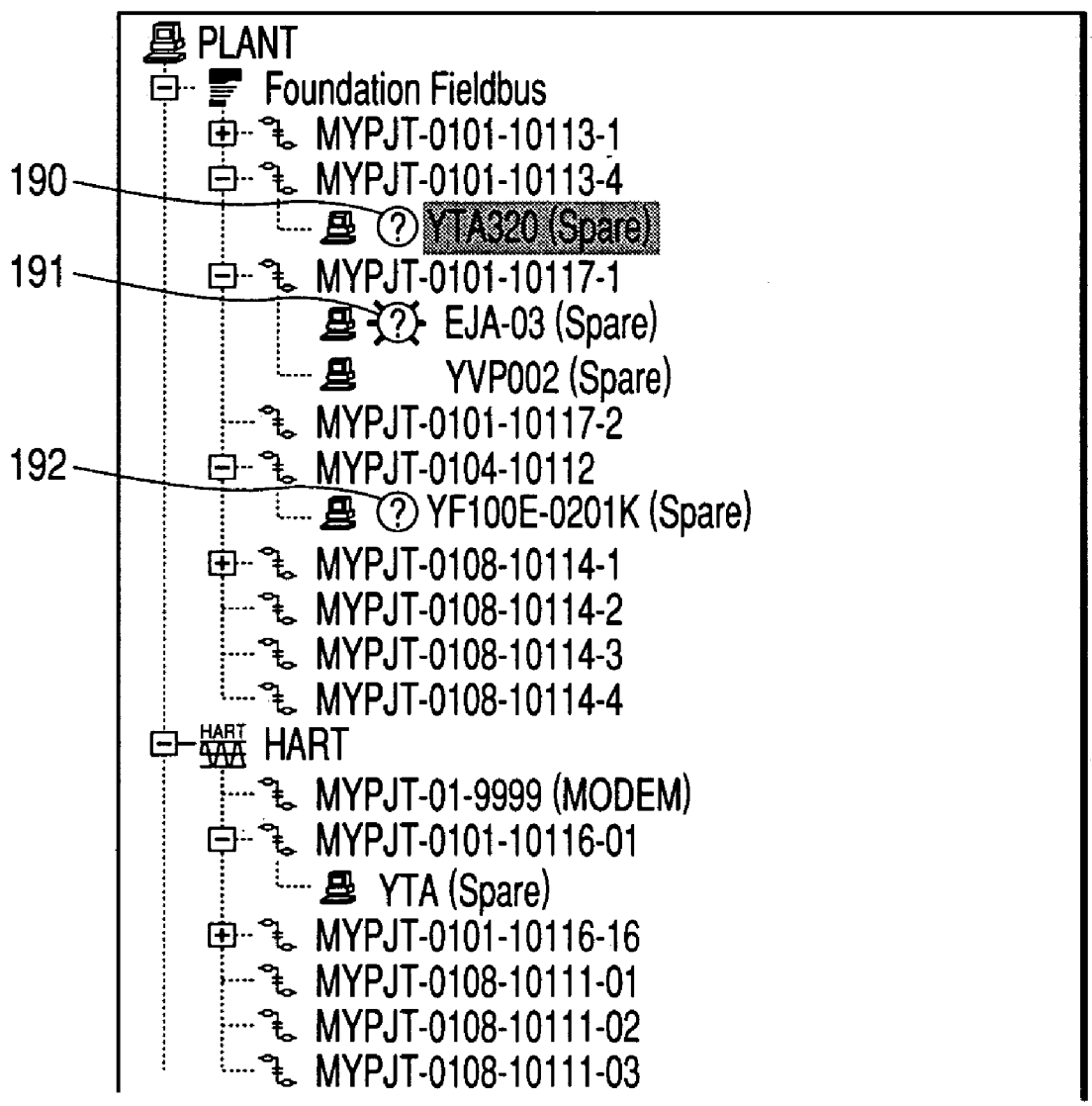
FIG. 11 is a drawing to show another display screen example of the machine management system in FIG. 8.
Figure 12:
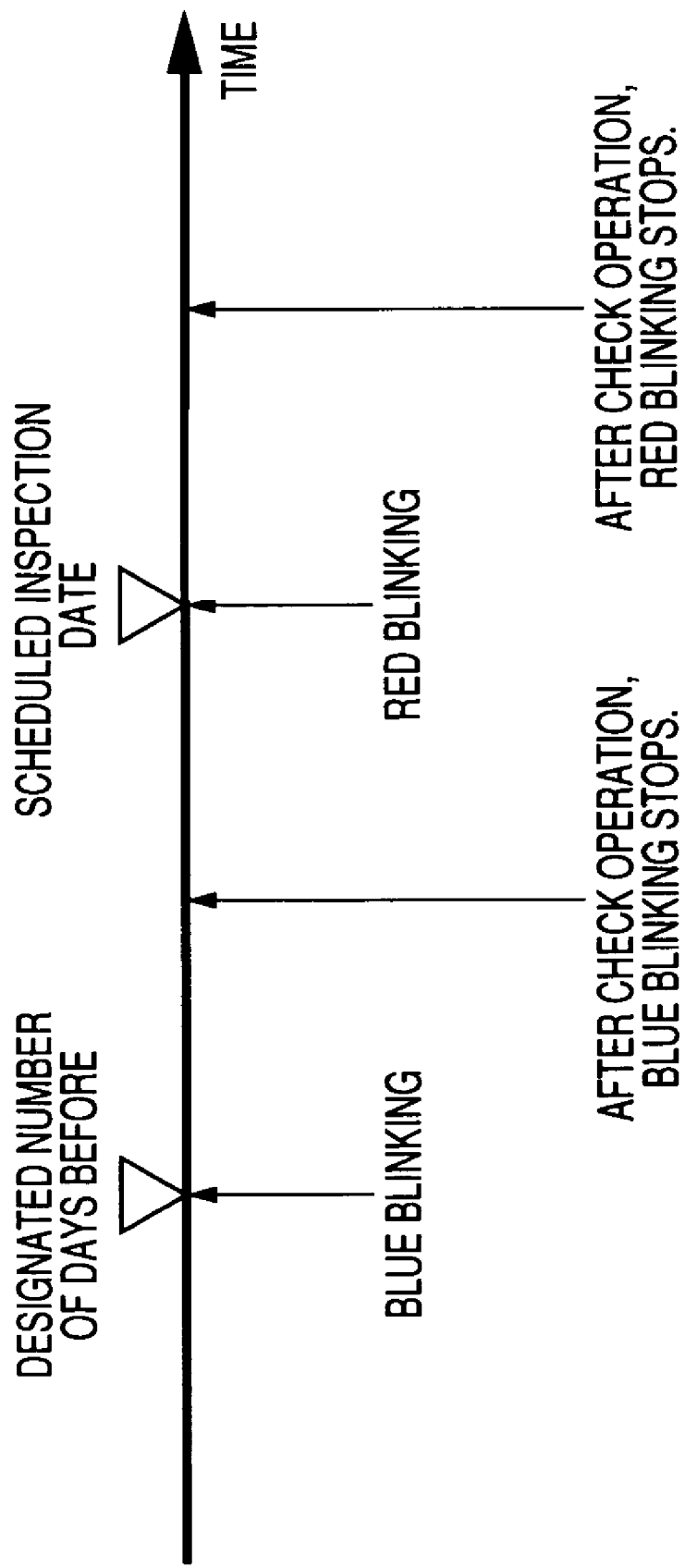
FIG. 12 is a drawing to show variation of the display state with time.

FIG. 11 is a drawing to show another display screen example of the machine management system in FIG. 8 and FIG. 12 is a drawing to show variation of the display state with time.

In FIG. 11, when the current date approaches the date when is a designated number of days before the scheduled inspection date, a blue question mark "?" 190 is blinked. When the user performs check operation, the blinking of the mark "?" stops.

On and after the scheduled inspection date, a red question mark "?" 191 is blinked until reception of user's check operation.

Upon reception of user's check operation, blinking a red question mark "?" 192 corresponding to the user's check operation stops.

When the current date does not reach the designated number of days before the scheduled inspection date, no question mark "?" is displayed; when inspection terminates and is approved, the question mark "?" disappears.

The mark blinked for the machine reaching the date the designated number of days before the scheduled inspection date and the mark blinked for the machine reaching the scheduled inspection date are thus displayed in different colors.

The marks are thus displayed, whereby oversights of inspection can be decreased. The inspection state can be determined easily.

According to the fourth embodiment of the invention, the following advantages can be provided:

(1) The machine state can be displayed in three categories of "normal," "anomaly (not yet checked)," and "anomaly (checked)." Accordingly, when an anomaly occurs in a machine, the user can easily determine whether the anomaly has been checked or is not yet checked. The user can be prevented from making a determination mistake as to whether the anomaly has been checked or is not yet checked. The user can also be prevented from overlooking an unchecked anomaly.

(2) If an anomaly again occurs in the machine whose anomaly has been checked for another reason, "anomaly (not yet checked)" is again displayed. Accordingly, the user can find the new anomaly.

(3) An unchecked machine anomaly can be represented in the tree view displayed as a tree structure provided by classifying the machines as a plant hierarchy.

(4) Blink display of an unchecked anomaly is produced appealing to vision, so that oversights of the user can be decreased.

(E) Fifth Embodiment

Figure 13:
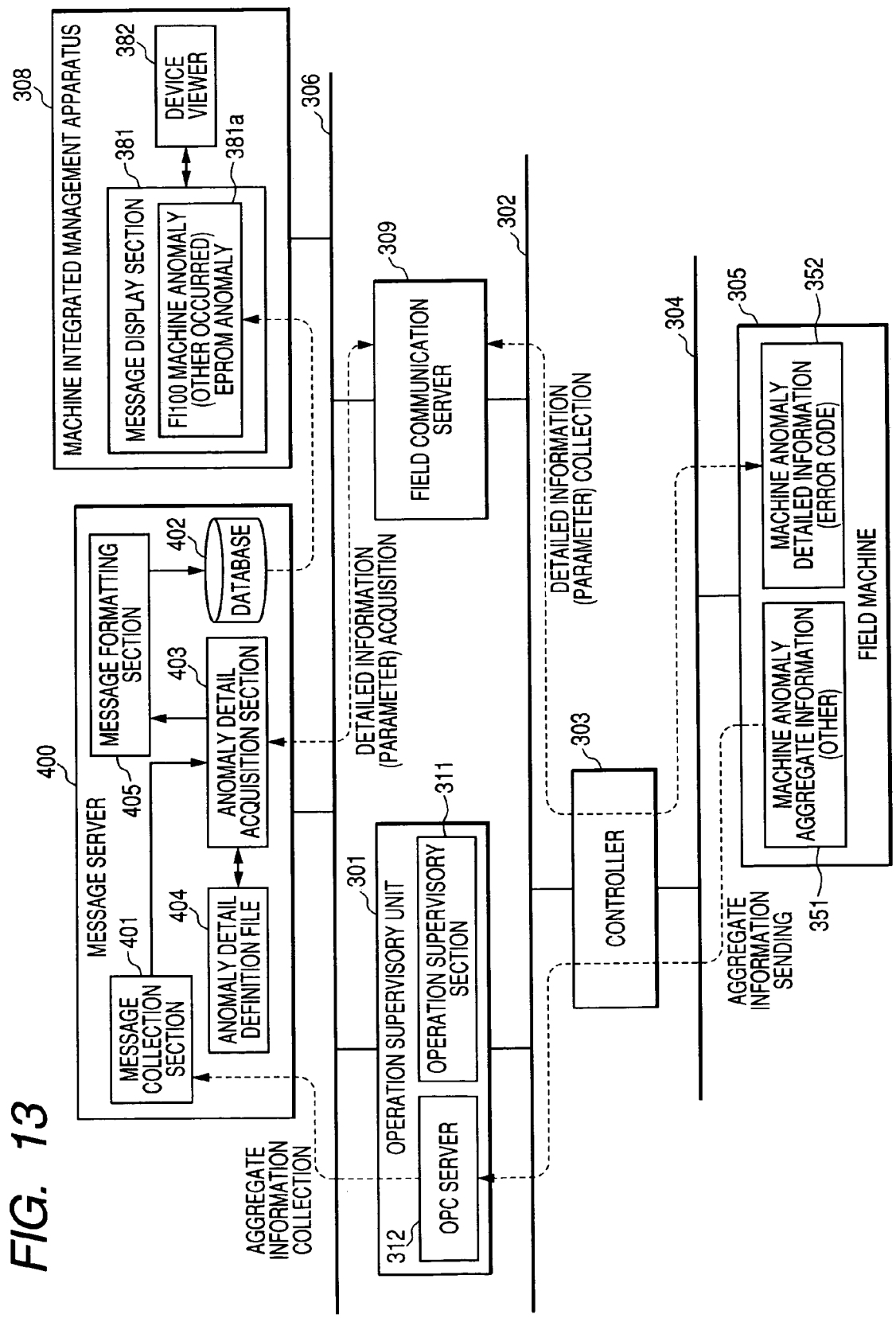
FIG. 13 is a functional block diagram to show an embodiment of a message server of the invention applied to a distributed control system.

FIG. 13 is a functional block diagram to show an embodiment of a message server of the invention applied to a distributed control system wherein a client of the message server is a machine integrated management apparatus.

The invention is characterized by the fact that a general purpose environment is constructed wherein an equivalent function to a device viewer installed in a machine integrated management apparatus as standard equipment is constructed in a message server and a client of the message server can be provided with detailed information of machine anomaly in real time.

An operation supervisory unit 301 in a distributed control system includes an operation supervisory section 311 for executing plant operation supervision and an OPC server 312 having a standard interface for data reference to collect messages sent from subordinate units and sending the messages to a superior client.

The operation supervisory unit 301 and a controller 303 for performing plant control are connected to a control bus 302. The operation supervisory unit 301 and the controller 303 communicate with each other through the control bus 302. The controller 3.03 and a field machine 305 are connected to a field bus 304. The controller 303 and the field machine 305 communicate with each other through the field bus 304.

If the field machine 305 is a machine conforming to Foundation Fieldbus-H1 (simply FF-H1) standard, a sensor anomaly, a fatal anomaly, and the like are set in a parameter of BLOCK_ERR as bit information as the FF-H1 specifications. On the other hand, a vendor-proper self-diagnosis anomaly not included in the FF-H1 specifications is set in an "other" bit of the BLOCK_ERR parameter as aggregate information of machine anomaly. An aggregate parameter storage section 351 stores an aggregate parameter of machine anomaly.

In this case, generally the FF-H1 machine sets detailed error code indicating the description of self-diagnosis in a vendor-proper machine parameter. For example, the detailed error code is set in a parameter of XD_ERROR of a transducer block. A detailed parameter storage section 352 stores a detailed parameter of machine anomaly.

When a vendor-proper self-diagnosis anomaly occurs, the field machine 305 sends a field bus message of "Machine anomaly: Other occurred" to a superior unit as aggregate information. This information is collected in the OPC server 312 of the operation supervisory unit 301 via the controller 303.

A general purpose communication bus 306 is a bus typified by Ethernet (registered trademark). The operation supervisory unit 301, a message server 400, and a machine integrated management apparatus 308 are connected to the general purpose communication bus 306. A message collection section 401 of the message server 400 collects aggregate information concerning each machine anomaly through the general purpose communication bus 306 from the OPC server 312 of the operation supervisory unit 301 and stores the aggregate information in a database 402 as history data.

In the machine integrated management apparatus 308, a message display section 381 acquires the aggregate information concerning machine anomaly stored in the database 402 of the message server 400 via the general purpose communication bus 306 and displays the aggregate information on a screen 381a. If the tag name of the field machine 305 is FI100, a message of "FI100 machine anomaly (other occurred)" is displayed. The user can recognize that some machine error occurred in FI100 according to the message.

In the machine integrated management apparatus 308, the message "machine anomaly" is displayed on the screen 381a, informing the user that a machine anomaly occurred. However, the user cannot be provided with detail information indicating what occurred in the machine from the message indicating "Other" only. To solve this problem, the machine integrated management apparatus 308 includes a device viewer 382 for referencing detailed information as standard equipment.

A field communication server 309 has an OPC interface, is connected between the general purpose communication bus 306 and the control bus 302, accesses the detailed parameter storage section 352 of the field machine 305 via the controller 305, and collects the error code of the detailed parameter concerning the machine anomaly set therein at regular time intervals.

When the message collection section 401 receives new aggregate information sent from the field machine 305, an anomaly detail acquisition section 403 is automatically called. The anomaly detail acquisition section 403 has an equivalent function to that of an anomaly detail acquisition section 382a of the device viewer 382, and acquires the error code of the detailed parameter of the machine from the field communication server 309 based on anomaly occurrence machine (FI100) information collected by the message collection section 401.

At the same time, the anomaly detail acquisition section 403 references an anomaly detail definition file 404 storing defined character string information for interpreting the error code of the parameter for each machine type, acquires the character string information corresponding to the error code of the parameter acquired from the field communication server 309, and passes the character string information to a message formatting section 405 together with aggregate information. The anomaly detail definition file 404 is an equivalent function to an anomaly detail definition file 82b of the device viewer 382.

The message formatting section 405 again formats the aggregate information passed from the anomaly detail acquisition section 403, for example, "FI100 machine anomaly (other occurred)" and detailed information obtained by referencing the anomaly detail definition file 404 based on the error code set in the detailed parameter storage section 352, for example, "EPROM anomaly" and stores the information in the database 402.

The machine anomaly information stored in the database 402 is reflected on the message display section 381 of the machine integrated management apparatus 308. "FI100 machine anomaly (other occurred) EPROM anomaly" is displayed on the machine integrated management apparatus 308; the information into which the aggregate information and the detailed information are combined in real time can be displayed on the screen 381a.

A signal processing flow in such a configuration will be discussed.

(1) The field machine 305 detects an EPROM anomaly, for example, in a self-diagnosis, sets aggregate information to set the "other" bit of the BLOCK_ERR parameter to ON in the aggregate parameter storage section 351 of machine anomaly, and sends the aggregate information to a superior unit as an alarm message. At the same time, the field machine 305 sets the detailed error code representing "EPROM anomaly" in the parameter of XD_ERROR of the transducer block and stores the detailed error code in the detailed parameter storage section 352 of machine anomaly.

(2) Upon reception of aggregate information "FI100 machine anomaly (other occurred)" from the OPC server 312 of the operation supervisory unit 301, the message collection section 401 calls the anomaly detail acquisition section 403 to add detailed information.

(3) The anomaly detail acquisition section 403 references the anomaly detail definition file 404 and acquires the character string information corresponding to the error code of the parameter of the machine.

(4) At the same time, the anomaly detail acquisition section 403 acquires the parameter stored in the detailed parameter storage section 352 of machine anomaly of the field machine 305 online via the field communication server 309 to acquire detailed information.

(5) The anomaly detail acquisition section 403 passes the character string provided by interpreting the error code of the acquired parameter based on the definition information in the anomaly detail definition file 404 to the message formatting section 405.

(6) The message formatting section 405 adds detailed character string information to the original aggregate information to provide message information and stores the reformatted message information in the database 402. The message with the detailed information added to the aggregate information is displayed on the screen 381a of the message display section 381 of the machine integrated management apparatus 308 reflecting the information.

In the embodiment in FIG. 13, the anomaly detail acquisition section 403 and the message formatting section 405 are separate functional blocks, but the function of the message formatting section 405 can also be built in the anomaly detail acquisition section 403 to form one functional block.

In the embodiment in FIG. 13, the machine integrated management apparatus 308 is illustrated as the client of the message server 400, but the message server of the invention has general versatility for acquiring detailed information of machine anomaly and therefore the client is not limited to the machine integrated management apparatus.

(F) Sixth Embodiment

Figure 14:
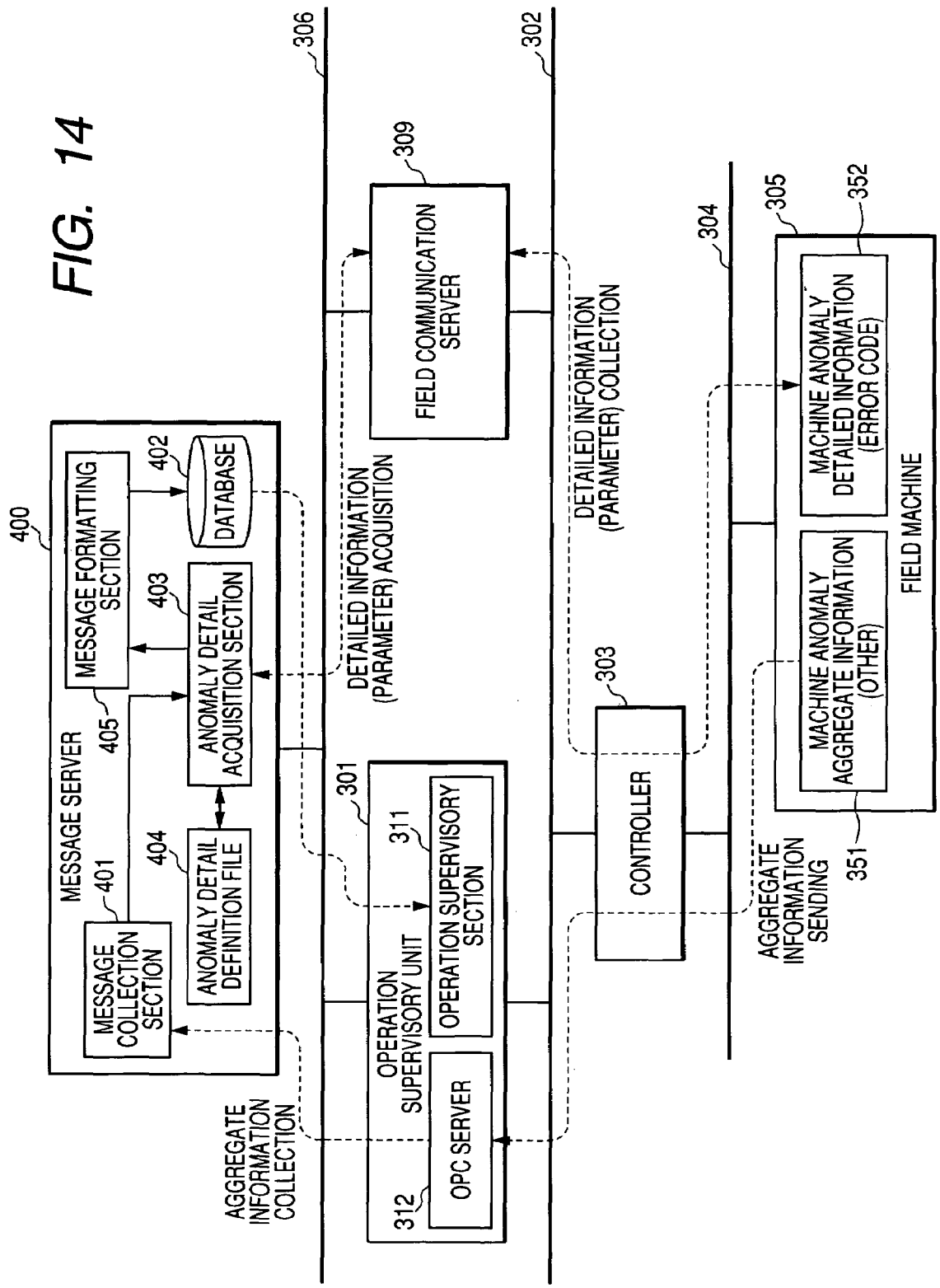
FIG. 14 is a functional block diagram to show an embodiment of a message server of the invention applied to a distributed control system.

FIG. 14 is a functional block diagram to show a sixth embodiment of the invention. A client of a message server is an operation supervisory unit 301. That is, a message to which detailed information stored in a database 402 of a message server 400 is added is reflected on a message display screen of the operation supervisory unit 301 through a general purpose communication bus 306.

According to the configuration, detailed information rather than aggregate information of "Other" only can be displayed on the message display screen of the operation supervisory unit 301, so that taking steps keeping track of details of a machine anomaly is facilitated without starting up an additional unit such as a device viewer of a machine integrated management apparatus.

In the embodiment in FIG. 14, the message server 400 is shown as an independent apparatus connected to the general purpose communication bus 306, but anomaly detail acquisition section 403, an anomaly detail definition file 404, and the message formatting section 405 can also be formed in the operation supervisory unit 301.

Further, if a superior application for analyzing an abnormal message is adopted as a client, as detailed information rather than aggregate information "Other" is added, the understanding degree of each message in the application can be enhanced and the message analysis accuracy can be improved.

According to the fifth and sixth embodiments of the invention, the following advantages can be provided:

(1) The user can know details of a machine anomaly without starting the device viewer when a machine anomaly message is originated.
(2) Detailed information is added to a machine anomaly message, so that trace containing the detailed information is made possible.
(3) Since the message server has general versatility capable of acquiring detailed information of machine anomaly, the clients are not limited. For example, if an operation supervisor unit of a distributed control system is a client, detailed information of machine anomaly can also be displayed on a message screen of the supervisory unit for the operator to supervise the operation of each machine.

What is claimed is:

1. A machine management system for managing machines existing in a plant, comprising:
   a hierarchy display processing section that classifies the machines existing in the plant under a multilevel hierarchy and displays the classified machines on a screen hierarchically; and
   a diagnosis result display processing section that displays a diagnosis result of each machine displayed on the screen and a summary of a diagnosis result of at least one machine which is not displayed on the screen and is classified to a level lower than that of the machines displayed on the screen.

2. The machine management system according to claim 1, wherein the diagnosis result display processing section displays a summary showing a normal diagnosis result when all of the diagnosis results of the nondisplayed machines is normal, and the diagnosis result display processing section displays a summary showing an abnormal diagnosis result when at least one of the diagnosis results of the nondisplayed machines is abnormal.

3. The machine management system according to claim 1, wherein the diagnosis result display processing section displays the diagnosis result with an icon.

4. The machine management system according to claim 1, wherein:
   the hierarchy display processing section displays the classified machines on a screen hierarchically in a tree structure;
   the diagnosis result display processing section is coupled to the hierarchy display processing section.

5. The machine management system according to claim 4, wherein the diagnosis result display processing section displays a summary showing a normal diagnosis result when all of the diagnosis results of the nondisplayed machines is normal, and the diagnosis result display processing section displays a summary showing an abnormal diagnosis result when at least one of the diagnosis results of the nondisplayed machines is abnormal.

6. The machine management system according to claim 4, wherein the diagnosis result display processing section displays the diagnosis result with an icon.

7. A machine management system for managing machines existing in a plant, comprising:
   a hierarchy display processing section that classifies the machines existing in the plant under a multilevel hierarchy and displays the classified machines on a screen hierarchically;
   a diagnosis result display processing section that displays an alarm level of each machine displayed on the screen and the highest alarm level out of least one alarm levels of at least one machines which is not displayed on the screen and is classified to a level lower than that of the machines displayed on the screen.

8. The machine management system according to claim 7, further comprising:
   a selection display processing section that selectively displays a machine whose alarm level is equal to or greater than a predetermined level.

9. The machine management system according to claim 7, wherein the diagnosis result display processing section displays the alarm level with an icon.

10. The machine management system according to claim 7, wherein:
    the hierarchy display processing section displays the classified machines on a screen hierarchically in a tree structure;
    the diagnosis result display processing section is coupled to the hierarchy display processing section.

11. The machine management system according to claim 10, further comprising:
    a selection display processing section that selectively displays a machine whose alarm level is equal to or greater than a predetermined level.

12. The machine management system according to claim 10, wherein the diagnosis result display processing section displays the alarm level with an icon.

13. A machine management system for managing machines existing in a plant, comprising:
    a hierarchy display processing section that classifies nodes existing in each level of the plant under a multilevel hierarchy and displays the classified machines on a screen hierarchically;
    a diagnosis result display processing section that displays a state of each node displayed on the screen and a summary of a state of at least one nodes which is not displayed on the screen and is classified to a level lower than that of the nodes displayed on the screen.

14. The machine management system according to claim 13, wherein the diagnosis result display processing section displays a summary showing a normal state when all of the states of the nondisplayed nodes is normal, and the diagnosis result display processing section displays a summary showing a special state when at least one of the states of the nondisplayed nodes is special.

15. The machine management system according to claim 13, wherein the diagnosis result display processing section displays the state with an icon.

16. The machine management system according to claim 13, wherein:
- the hierarchy display processing section displays the classified machines on a screen hierarchically in a tree structure;
- the diagnosis result display processing section is coupled to the hierarchy display processing section.

17. The machine management system according to claim 16, wherein the diagnosis result display processing section displays a summary showing a normal state when all of the states of the nondisplayed nodes is normal, and the diagnosis result display processing section displays a summary showing a special state when at least one of the states of the nondisplayed nodes is special.

18. The machine management system according to claim 16, wherein the diagnosis result display processing section displays the state with an icon.

19. A machine management system for managing machines existing in a plant, comprising:
- a machine display processing section that displays the machines existing in the plant on a screen;
- an operation section for a user of the machine management system to check on the screen a machine whose diagnosis result is abnormal;
- a diagnosis result display processing section that displays a diagnosis result of each machine existing in the plant,
- the diagnosis result display processing section displays diagnosis results whose display patterns are different between a machine before being checked through the operation section and a machine checked through the operation section out of machines whose diagnosis results are abnormal.

20. The machine management system according to claim 19, wherein the diagnosis result display processing section blinks a mark showing an anomaly as a diagnosis result of the machine before being checked, and the diagnosis result display processing section lights the mark showing an anomaly as a diagnosis result of the machine checked.

21. The machine management system according to claim 19, wherein when a new anomaly occurs in the machine checked through the operation section, the diagnosis result display section displays a diagnosis result of the machine with a pattern before being checked through the operation section.

22. The machine management system according to claim 19, wherein the diagnosis result display section displays a first blinking mark corresponding to a machine reaching a date which is a designated number of days before a scheduled inspection date, and the diagnosis result display section displays a first lighted mark when the machine is checked through the operation section.

23. The machine management system according to claim 22 wherein the diagnosis result display section displays a second blinking mark corresponding to a machine reaching a scheduled inspection date, and the diagnosis result display section displays a second lighted mark when the machine is checked through the operation section.

24. The machine management system according to claim 22, wherein the diagnosis result display section displays a second blinking mark corresponding to a machine reaching a scheduled inspection date, the diagnosis result display section displays a second lighted mark when the machine is checked through the operation section, and a color of the first blinking mark and the first lighted mark is different form a color of the second blinking mark and the second lighted mark.

25. The machine management system according to claim 19, wherein the machine display processing section classifies the machines existing in the plant under a multilevel hierarchy and displays the classified machines on the screen in the multilevel tree hierarchy.

* * * * *